United States Patent
Sonnekalb et al.

(10) Patent No.: US 11,285,783 B2
(45) Date of Patent: Mar. 29, 2022

(54) CIRCULATION SYSTEM FOR A FUEL CELL VEHICLE

(71) Applicant: KONVEKTA AG, Schwalmstadt (DE)

(72) Inventors: Michael Sonnekalb, Schwalmstadt (DE); Sebastian Fink, Willingshausen (DE)

(73) Assignee: KONVEKTA AG, Schwalmstadt (DE)

( * ) Notice: Subject to any disclaimer, the term of this patent is extended or adjusted under 35 U.S.C. 154(b) by 4 days.

(21) Appl. No.: 16/058,618

(22) Filed: Aug. 8, 2018

(65) Prior Publication Data
US 2019/0047365 A1 Feb. 14, 2019

(30) Foreign Application Priority Data
Aug. 13, 2017 (DE) .......................... 102017118424.4

(51) Int. Cl.
*B60H 1/14* (2006.01)
*H01M 10/613* (2014.01)
(Continued)

(52) U.S. Cl.
CPC .......... *B60H 1/143* (2013.01); *B60H 1/00271* (2013.01); *B60H 1/00278* (2013.01);
(Continued)

(58) Field of Classification Search
CPC .......................... B60H 1/143; B60H 1/00271; B60H 1/00278; B60H 1/00371; B60H 1/00385;
(Continued)

(56) References Cited

U.S. PATENT DOCUMENTS

| 2010/0012295 A1* | 1/2010 | Nemesh | H01M 10/615 165/104.19 |
|---|---|---|---|
| 2014/0102126 A1* | 4/2014 | Aoun | B60H 1/00899 62/244 |
| 2016/0107505 A1* | 4/2016 | Johnston | B60H 1/00914 165/202 |

FOREIGN PATENT DOCUMENTS

| DE | 202007011617 U1 | 2/2009 |
|---|---|---|
| DE | 102011076737 A1 | 12/2012 |
| EP | 2660086 A1 | 2/2013 |

* cited by examiner

*Primary Examiner* — Tavia Sullens
(74) *Attorney, Agent, or Firm* — Brian K. Yost; Decker Jones, PC

(57) ABSTRACT

The invention relates to a circulation system (1) for a fuel cell vehicle, with a first flow circuit (10) which conveys a first fluid and can be operated in heat pump operation; a second flow circuit (30) which can be operated in a heat exchange connection to the first flow circuit (10) and which conveys a second fluid, in particular for the purpose of cooling a traction battery (39); and a third flow circuit (50) which can be operated in a heat exchange connection to the second flow circuit (30) and which conveys a third fluid, in particular for the purpose of cooling a fuel cell arrangement (55), wherein the circulation system (1) also has a fourth flow circuit (70) which conveys a fourth fluid, and at least one conveying device (71) for the fourth fluid, least one heat exchanger (85) and/or convector (81) to which the fourth fluid can be conveyed for the purpose of heating at least one interior of a fuel cell vehicle, and one heat exchanger (7) to which the fourth fluid can be conveyed for a heat exchange with the first fluid are arranged in the fourth flow circuit (70), wherein this heat exchanger (7) to which the first fluid can also be conveyed is arranged in the high-pressure region of the first flow circuit (10). Such a circulation system (1)
(Continued)

improves the flexibility and efficiency of the temperature control of vehicle interiors and of components of a fuel cell vehicle.

12 Claims, 2 Drawing Sheets

(51) Int. Cl.
*H01M 10/66* (2014.01)
*H01M 8/04007* (2016.01)
*H01M 8/04029* (2016.01)
*H01M 10/625* (2014.01)
*B60H 1/00* (2006.01)
*B60H 1/32* (2006.01)
*H01M 10/6568* (2014.01)

(52) U.S. Cl.
CPC ..... *B60H 1/00371* (2013.01); *B60H 1/00385* (2013.01); *B60H 1/32284* (2019.05); *H01M 8/04029* (2013.01); *H01M 8/04067* (2013.01); *H01M 10/613* (2015.04); *H01M 10/625* (2015.04); *H01M 10/6568* (2015.04); *H01M 10/66* (2015.04); *B60H 2001/00307* (2013.01); *B60L 2200/18* (2013.01)

(58) Field of Classification Search
CPC ......... H01M 8/04029; H01M 8/04067; H01M 10/613; H01M 10/625; H01M 10/66
See application file for complete search history.

CIRCULATION SYSTEM FOR A FUEL CELL VEHICLE

FIELD OF THE INVENTION

The invention relates to a circulation system for a fuel cell vehicle, wherein the circulation system has at least one first circulation, which conveys a first fluid, in which are arranged, in the intended flow direction of the first fluid, at least one compressor, at least one heat exchanger used as a condenser or gas cooler, at least one expansion organ, and at least one further heat exchanger used as an evaporator; a second circulation which conveys a second fluid, in particular for the purpose of cooling a traction battery, which can be operated with a heat exchange connection to the first circulation; and a third circulation which conveys a third fluid, in particular for the purpose of cooling a fuel cell arrangement, which can be operated with a heat exchange connection to the second circulation. A fuel cell arrangement is an arrangement of one fuel cell or a plurality of fuel cells—such as, for example, a fuel cell stack. In a fuel cell arrangement, electrical energy is produced from chemical energy by means of an electrochemical process. A fuel, such as hydrogen ($H_2$), by way of example, reacts with an oxidant, such as the surrounding air, to form water ($H_2O$), thereby producing electrical energy. As such, in a low-temperature PEM fuel cell, hydrogen ($H_2$) is used as a fuel.

The invention further relates to a fuel-cell vehicle having such a circulation system. A fuel cell vehicle is a vehicle having a fuel cell arrangement, wherein at least a part of the electrical energy generated by the fuel cell arrangement is used for the operation of at least one electric drive motor of the vehicle. Fuel cell vehicles include, in particular, battery-based electric motor vehicles which have a range extender module with a fuel cell arrangement used to generate electrical energy. The electrical energy generated therewith is fed to the traction battery of the vehicle, which stores it. As such, the traction battery can be recharged during driving, which results in a greater range for the vehicle than with operation using only a battery. Plug-in designs for fuel cell vehicles are known, in which the traction battery can also be recharged when connected to on electric charging station.

During the operating of a traction battery, and during operation of a fuel cell arrangement, heat accumulates, such that there is a need to cool the same. The preferred operating temperature for a traction battery lies in the range between 20° C. and 30° C. For a fuel cell arrangement, the operating temperature is slightly higher—for example, about 80° C.

BACKGROUND OF THE INVENTION

Prior Art

A circulation system with a cooling circulation for the purpose of cooling the fuel cell arrangement, and a further cooling circulation of the traction battery, wherein the dissipated heat can be further used in the vehicle, is known. As such, DE 10 2011 076 737 A1 discloses, in FIG. 1, a circulation system for a fuel cell vehicle with three circulations. The first circulation (called the "coolant circulation 50" in the text) is a coolant circulation with a compressor, condenser, expansion organ, evaporator, and heat exchanger with a heat exchange connection to the second circulation (called the "first fluid conveying system 12"). The second circulation, which among other things serves to cool the traction battery, in turn has a heat exchange connection by means of a heat exchanger to a third circulation (called the "second fluid conveying system 70" in the text), wherein the third circulation serves the purpose of cooling the fuel cell arrangement. However, in the circulation system disclosed in DE 10 2011 076 737 A1, the vehicle interior is heated via the second circulation. It is disadvantageous that the heating operation must be orchestrated together with the cooling of the traction battery, likewise arranged in the second circulation. Furthermore, the heat transferred at the heat exchanger from the second circulation 12 to the first circulation 50 is disadvantageously not used for the heating of the vehicle interior. The first circulation 50 in DE 10 2011 076 737 A1 is not a heat pump, and is specifically not conceived as such. In addition, a material-, cost-, and weight-intensive conduit system for the second circulation (called the "first fluid conveying system 12" in the text) is necessary in DE 10 2011 076 737 A1, because the location of the heat exchanger used for heating the vehicle interior and the location of the traction battery may be very far away from each other in the vehicle.

The invention therefore addresses the problem of providing a circulation system for a fuel cell vehicle, said circulation system having at least one first circulation which conveys a first fluid, in which are arranged, in the intended flow direction of the first fluid, at least one compressor, at least one heat exchanger used as a condenser or gas cooler, at least one expansion organ, and at least one further heat exchanger used as an evaporator; a second circulation which conveys a second fluid, in particular for the purpose of cooling a traction battery, and which can be operated with a heat exchange connection to the first circulation, and a third circulation which conveys a third fluid, in particular for the purpose of cooling a fuel cell arrangement, and which can be operated with a heat exchange connection to the second circulation. A second, corresponding problem addressed by the invention is that of providing an improved fuel-cell vehicle having such a circulation system.

SUMMARY OF THE INVENTION

The first problem is addressed by a circulation system according to the features of claim 1. The problem is solved in that the circulation system for a fuel cell vehicle comprises at least one first circulation which conveys a first fluid and can be operated in heat pump operation, in which are arranged, in the intended flow direction of the first fluid, at least one compressor, at least one heat exchanger used as, a condenser or gas cooler, at least one expansion organ, and at least one further heat exchanger used as an evaporator, wherein at least one first heat exchanger to which the first fluid can be conveyed is arranged after the at least one expansion organ and before the at least one compressor; a second circulation which conveys a second fluid, in particular for the purpose of cooling a traction battery, wherein at least one conveying device for the second fluid, the first heat exchanger to which the second fluid can be conveyed for a heat exchange with the first fluid, and a heat exchange connection designed for heat exchange between the second fluid and a traction battery are arranged in the second circulation; and a third circulation which conveys a third fluid, in particular for the purpose of cooling a fuel cell arrangement, wherein at least one conveying device for the third fluid, one heat exchanger to which the third fluid can be conveyed for a heat exchange with the second fluid, and one heat exchange connection which is designed for heat exchange of a fuel cell arrangement with the third fluid are arranged in the third circulation, wherein the circulation system also has a fourth circulation which conveys a fourth fluid, and at least one conveying device for the fourth fluid, at least one heat exchanger and/or convector to which the fourth fluid can be conveyed for the purpose of heating at least one interior of a fuel cell vehicle, and one heat exchanger to which the fourth fluid can be conveyed for a heat exchange with the first fluid are arranged in the fourth circulation, wherein this beat exchanger to which the first fluid can also be conveyed is arranged in the first circulation after the at least one compressor and before the at least one expansion organ. The circulation system according to the invention has the advantage that the first circulation, in heat pump operation, uses the heat emitted by the fuel cell arrangement and the traction battery particularly effectively to heat the fourth fluid in the fourth circulation. The interior of a fuel cell vehicle can accordingly be heated more effectively, conveniently, and simply better as a result. Advantageously, the location of the fourth circulation is not dependent on the second and third circulations. This saves material, cost, and weight in fluid conduits and valves for the second circulation, which is not directly used for heating the vehicle interior. Advantageously, the cooling capacity of the first circulation, and therefore also the second and third circulations, is effectively improved when the first fluid releases heat to the fourth circulation. Specifically adapted second and third fluids can be used for the cooling of the fuel cell arrangement and traction battery, respectively.

Advantageous embodiments, further developments, and improvements of the respective subject matters of the invention are given in the dependent claims.

According to an advantageous embodiment of the present circulation system according to the invention, the first circulation is designed in such a manner that a fluid which can be operated in a supercritical state can be operated therein, in a supercritical state, as a first fluid. For such a circulation operated with high internal pressure, the fluid on the high-pressure side is in a supercritical state, such that the heat exchanger cooling the fluid in the absence of condensation constitutes a gas cooler. Although arrangements for air conditioning a vehicle which work in supercritical states are known from EP 0424 474 B1 and DE 44 32 272 C2, by way of example, none are known for circulation systems according to the features of claim 1. The fluids which can be used for a circulation which operates in a supercritical state are significantly less harmful to the environment than coolants for subcritical operation in a coolant and/or heat pump circulation, such as HFCs—and especially the conventional R134a. Also, fluids which can be used in a heat pump which is operable down to significantly lower outside temperatures of −20° C. can be used in a circulation which operates in a supercritical state as a heat pump. $CO_2$ (carbon dioxide), available on the market under the coolant name R744, is particularly advantageous as the first fluid which can be operated in a supercritical state in the first circulation. $CO_2$ is only very slightly harmful to the environment compared to coolants that operate in subcritical states, can be used at low outside temperatures down to −20° C. in heat pump operation, and is simple and cheap to procure.

Preferably, the second and fourth fluids are water or a water-glycol mixture, and the third fluid is deionized water. Water or water-glycol mixtures are cheap and effective cooling and/or heating fluids with high heat capacity. Deionized water, with its low electrical conductivity, is especially well-suited for cooling a fuel cell arrangement. Another coolant with too-high conductivity could harm the fuel cell arrangement and, affect its performance.

According to an advantageous embodiment of the present invention, a further heat exchanger designed as a fluid to air heat exchanger and operated as an evaporator is arranged in the first circulation after the at least one expansion organ and before the at least one compressor in the flow direction of the first fluid. As a result, air for at least a portion of the interior of the vehicle can be cooled via the first circulation—either by itself, or in addition to other cooling devices. This increases the flexibility of the vehicle interior air conditioning. At the same time, the cooling provided by the first circulation to the second, and therefore also to the third circulation, can be better regulated.

Preferably, at least one heating device which can additionally heat the second fluid, and/or the fourth fluid is connected or can be connected to the second circulation and/or the fourth circulation. If the heat output in the fourth circulation is insufficient for heating the vehicle interior, there is the possibility of additionally heating the fourth fluid, thereby increasing the heat output for the heating of the vehicle interior. At temperatures whim are too low for the traction battery—such as at −20° C. outside temperature, by way of example—there is the possibility in the second circulation, with a heating device which can additionally heat the second fluid, of better heating the second fluid to then achieve the correct operating temperature for the traction battery using the accordingly heated second fluid. This has particular advantages in the starting phase of a fuel cell vehicle at low outside temperatures.

According to an advantageous embodiment of the circulation system according to the invention, at least one further heat exchanger for cooling the air of at least a portion of an interior of a fuel cell vehicle is arranged in the second circulation after the first heat exchanger and before—or in an arrangement which bypasses—the heat exchange connection used for heat exchange between a traction battery and the second fluid, in the intended flow direction of the second fluid, and this at least one further heat exchanger can be connected to and disconnected from the second circulation by means of a switching device. This offers the possibility of cooling at least a portion of the vehicle interior—such as the air in the driver's seat area—using the second fluid which is cooled in the first heat exchanger by the first fluid. Because the second fluid cooled in the first heat exchanger does not cool the traction battery before this, the cooling effect which results for at least a portion of the vehicle interior is greater. Furthermore, because of the bypass arrangement of the further heat exchanger with respect to the traction battery, it is even possible for the second fluid to flow through the bypass with the further heat exchanger, according to the switching state of the switching device, which may include a three-way valve, for example, rather than flowing through the heat exchange connection with a traction battery at all. Consequently, the resulting cooling of the air of at least a portion of the interior of the fuel cell vehicle is particularly good. If the traction battery needs to be cooled, the switching device can accordingly switch back to the flow path of the second fluid for cooling the traction battery. Preferably, the switching device has a controller with which the fraction of the flow volume of the second fluid to the at least one further heat exchanger and, if the same, is in its bypass arrangement, also the fraction of the flow volume of the second fluid to the heat exchange connection with the traction battery, can be controlled. This increases the flexibility of the cooling in the second circulation. The flexibility of the temperature-control effect of the second fluid in the second circulation is particularly good if a heating device which can additionally heat the second fluid is arranged in the second circulation after, or in a bypass arrangement with respect to, the at least one further heat exchanger, in the intended flow direction of the second fluid, and before the heat exchange connection designed, for the heat exchange between a traction battery and the second fluid.

According to a preferred embodiment of the present invention, a heat exchanger used for a heat exchange between the second fluid and the third fluid is arranged in the second circulation after the heat exchange connection designed for a heat exchange between a traction battery and the second fluid, in the flow direction of the second fluid. Consequently, the cooling is connected downstream of a fuel cell arrangement which has a higher operating temperature than a traction battery, such that the traction battery is better cooled.

Preferably, the circulation system according to the invention has a control device by means of which the volume flows of fluids in the circulations can be controlled. This enables an advantageous regulation of the circulation system according to the momentary situation and usage. The control device can be designed, for example, in such a manner that it controls the volume flows into the circulations according to the temperatures of the fuel cell arrangement, or the traction, battery, of the interior air of the vehicle interior, and/or of the outside air.

According to an advantageous embodiment, the circulation system according to the invention is designed for a bus equipped with an electric drive motor and fuel cell arrangement. The circulation system can be used especially well and especially effectively for such a fuel cell vehicle.

Finally, the features of the dependent claims can be combined freely with each other in a manner not fixed by the order in which they are presented in the claims—to the extent that they are independent of each other.

The second problem is addressed by a fuel cell vehicle having a circulation system according to the invention. With regard to the advantages and the further advantageous embodiments and developments, attention is hereby directed to the explanations provided above for the circulation system according to the invention.

Preferably, such a vehicle having such a circulation system according to the invention is a bus equipped with an electric drive motor and a fuel cell arrangement.

BRIEF DESCRIPTION OF THE DRAWINGS

Embodiments of the invention are explained below with reference to the drawings, wherein.

DETAILED DESCRIPTION OF THE INVENTION

All drawings are to be understood schematically. For the purpose of greater clarity, images are not presented to scale.

Figure 1:
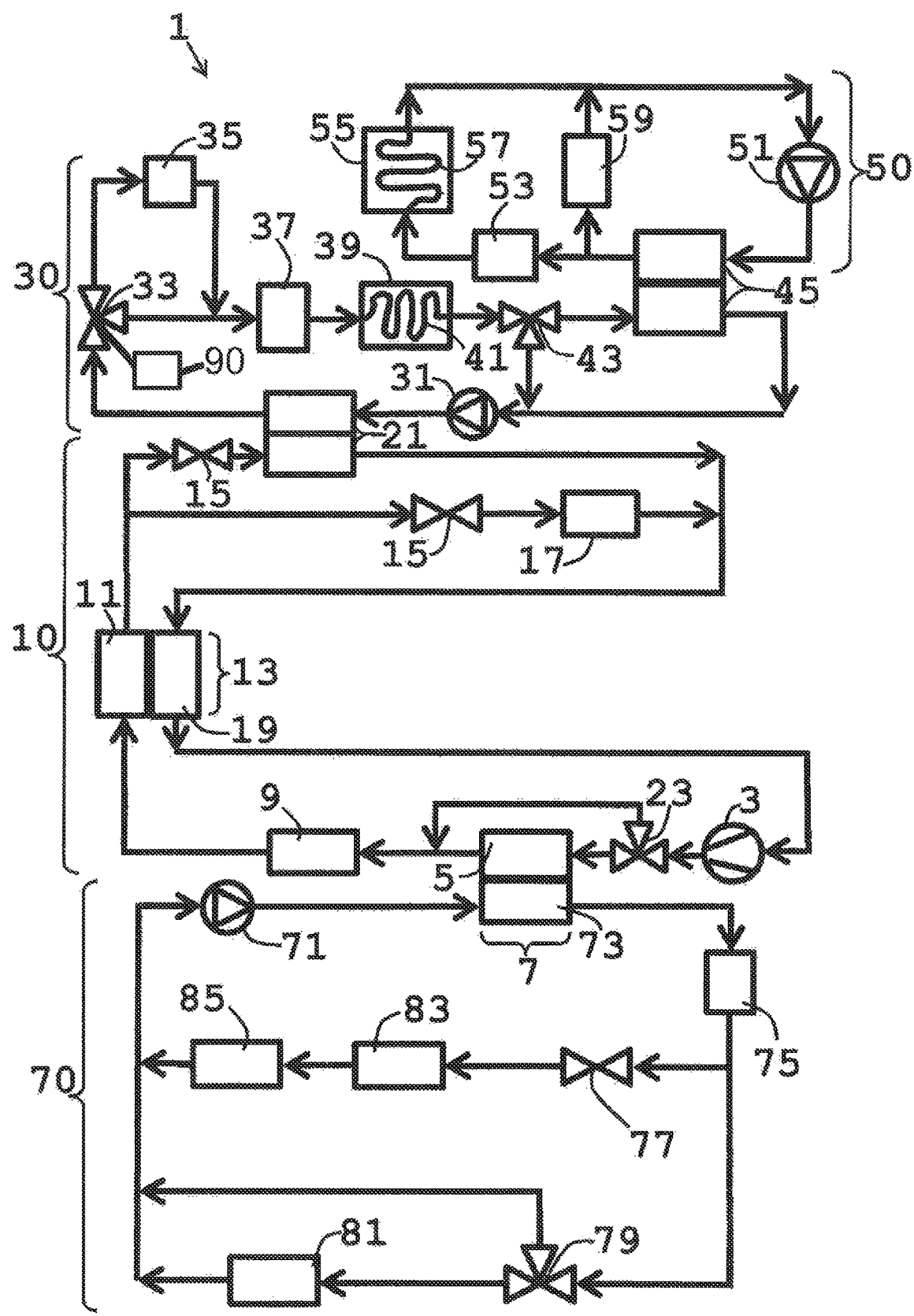
FIG. 1 shows, in a block diagram, an embodiment of the circulation system according to the invention, for a fuel cell vehicle.

FIG. 1 shows, in a block diagram, an embodiment of the circulation system 1 according to the invention, for a fuel cell vehicle. The first circulation, or flow circuit, 10, winch conveys a first fluid, is particularly intended for operation as a heat pump. In this embodiment, the first circulation 10 is designed to be pressure-resistant, in such a manner that— and, the components thereof are designed in such a manner that—the first fluid therein can be operated in the supercritical region. The first fluid is $CO_2$ (carbon dioxide). Other coolants which are suitable for supercritical operation can also be contemplated as the first fluid. The arrows depicted in FIG. 1 and FIG. 2 indicate the flow direction of the respective fluids. The first circulation 10 particularly includes, in the intended flow direction of the first fluid, connected via coolant lines, the following components of a heat pump circulation, which are suitable for supercritical operation:

a compressor 3, the first side 5 of the heat exchanger 7, with an associated bypass switched by a valve 23, a further heat exchanger 9, designed as a fluid-air heat exchanger and used as a gas cooler for heat exchange with the outside air, the high pressure side 11 of a heat exchanger 13 designed as an internal heat exchanger, two expansion elements 15 designed as expansion valves, the same being in a parallel connection, a heat exchanger 17 designed as an evaporator, a first heat exchanger 21 which can be connected parallel thereto via one of the two expansion elements 15, and, before the inlet to the compressor 3, the low pressure side 19 of the heat exchanger 13 designed as an internal heat exchanger.

The second circulation, or flow circuit, 30 conveys a second fluid, such as water, by way of example, or a water-glycol mixture, for example. It is included as a cooling circulation. The conveying device 31, which in this embodiment is designed as a water pump, pumps the second fluid through the first heat exchanger 21, which is designed as a fluid to fluid heat exchanger—for instance, a plate heat exchangers. In it 21, heat is exchanged between the second fluid and the first fluid, in heat, pump operation of the first circulation 10, the first fluid captures heat in the first heat exchanger 21 from the second fluid conveyed in the second circulation 30. The switching device 33 is arranged after the heat exchanger 21 in the flow direction of the second fluid. The switching device 33 includes a three-way valve in this embodiment. However, other well-known, suitable switching devices 33, such as a switching device 33 comprising two valves, can be contemplated. A further heat exchanger 35 for cooling the air of at least a portion of an interior of a fuel cell vehicle can be connected to and disconnected from the second circulation 30—that is, the second fluid can be made to how through the same or not—by means of the switching device 33. The further heat exchanger 35 is designed as a fluid to air heat exchanger with which the heat is drawn from the air via the cooled, second fluid for at least a portion of the vehicle interior—such as the driver's seat area. Embodiments in which a plurality of such further heat exchangers 35 can be arranged in such a manner allowing connection, to and disconnection from the second circulation, wherein not only a portion, but rather the entire vehicle interior, can be accordingly cooled, can also be contemplated. Optionally, the switching device 33 has a controller 90, by means of which the fraction of the flow volume of the second fluid to the at least one further heat exchanger 35 can be controlled. In this embodiment, a heating device 37 which can additionally heat the second fluid is connected downstream of the further heat exchanger 35 in the second circulation 30. The second fluid would flow directly to this heating device 37 when the heat exchanger 35 is disconnected by the switching device 33. The heating device 37 in this case is an electric heater made of PTC elements. However, other known, suitable heaters 37 can be contemplated, such as one which works by combustion of $H_2$ (hydrogen)—which is already stored in the vehicle for the operation of the fuel cell arrangement 55. Depending on whether the second, fluid must be preheated or not for the traction battery 39 of the fuel cell vehicle, the heating device 37 provides heat, or does not. For example, at outside temperatures below 0° C., the second fluid would be pre-heated by the heating device 37 in the starting phase of a fuel cell vehicle, so that the correct operating temperature is reached in the downstream traction battery 39 in the second circulation 30. Normally, though, the traction battery 39 must be cooled during its operation—that is, heat must be removed from it via the second fluid. In the second circulation 30, there is a heat exchange connection 41 designed for a heat exchange between the traction battery 39 and the second fluid. Such a heat exchange connection 41 can be designed in the manner which is conventional for the cooling of a traction battery 39—such as, for example, coolant lines which run around the traction batteries 39 in a coil shape. For the heat exchange connection 41, all known, suitable embodiments for cooling a traction battery 39 with a fluid conveyed in a cooling circulation can be contemplated.

A flow path of the second fluid, to the heat exchanger 45 can be connected in the second circulation 30 downstream of the heat exchange connection 41 designed for the heat exchange between the traction battery 39 and the second fluid, in the flow direction of the second fluid, via a switching device 43 designed in this embodiment as a three-way valve. The heat exchanger 45 is designed as a fluid to fluid heat exchanger—such as a plate heat exchanger, by way of example—and is provided for a heat exchange between the second fluid and the third fluid of the third circulation 50. At this position, heat can be released from the fluid to the second fluid. The heat absorbed by the second fluid in the second circulation 30 can then be released in the first heat exchanger 21 to the cooler, first fluid, which then captures the heat upon evaporation. The first fluid has been expanded in the expansion element 15 before the heat exchanger 21. The heat exchanger 21 is therefore arranged in the low-pressure region of the first circulation 10.

The third fluid is conveyed in the third circulation, or flow circuit, 50. The third circulation 50 is particularly intended for cooling a fuel cell arrangement 55. The third fluid consists of deionized water and/or distilled water in this embodiment. The heat exchanger 45, to which the third fluid can be conveyed for the purpose of a heat exchange with the second fluid, is arranged after the conveying device 51, designed as a water pump, in the flow direction of the third fluid. The filter element 53 connected upstream of the fuel cell arrangement 55 is used to filter particles out of the third fluid in the feed stream for the heat exchange connection 57 designed for the heat exchange between a fuel cell arrangement 55 and the third fluid. Such a heat exchange connection 57 is designed as a known and suitable type for the cooling of a fuel cell arrangement 55—such as, but not limited to, coolant lines which run around the fuel cell arrangement 55 in a coil shape. The fuel cell arrangement 55 includes, for example, without being limited thereto, low- and medium-temperature fuel cells based on a polymer-electrolyte membrane. A DC/DC converter 59 likewise cooled by the third fluid, which regulates the electric current of the fuel cell arrangement 55, is arranged parallel to the fuel cell arrangement 55 in the third circulation 50. From the heat exchange connection 57 with the fuel cell arrangement 55, the third fluid in the third circulation 50 continues to flow to the inlet of the conveying device 51. The arrangement of an ion exchanger which captures ions dissolved in the third fluid, such that the upper limit of a permissible conductance of the third fluid is not exceeded, can also be contemplated for the third circulation 50.

The fourth circulation, or flow circuit 70, which carries a fourth fluid, is thermally coupled to or decoupled from the high-pressure region of the first circulation 10, according to the switching state of the valve 23, via the heat exchanger 7 which is designed as a fluid to fluid heat exchanger, such as a plate heat exchanger, by way of example. As such, the heat exchanger 7 is arranged in the first circulation 10 in a manner allowing connection after the compressor 3 and before the two expansion elements 15. The fourth fluid is, by way of example, water or a water-glycol mixture. Other conventional temperature control fluids can be contemplated as the fourth fluid. The heat exchanger 7 is part of the first circulation 10, namely via its first side 5, as well as the fourth circulation 70, namely via its second side 73. From the conveying device 71 designed as a water pump, the fourth fluid is pumped through the second side 73 of the heat exchanger 7 to capture heat there from the first fluid flowing through the first side 5. The embodiment variants in which the heat exchanger 7 is arranged in the first circulation 10 without a bypass for the flow of the first fluid, and/or in which the heat exchanger 7 constitutes the only gas cooler or condenser in the first circulation 10, can also be contemplated. The fourth fluid flows from the conveying device 71 through the second side 73 of the first heat exchanger 7, then is conveyed through lines which are conventional for such heating circulations to an optional heating device 75 which can additionally heat the fourth fluid. From there, the fourth fluid flows, depending on the switching state of the further valves 77, 79, either directly to the inlet of the conveying device 71, or—prior to this—through the convector 81 in the vehicle interior, and/or through the further heating device 83 which can additionally heat the fourth fluid and the heat exchanger 85 for heating at least one interior space of the vehicle. The term 'at least' in this case is used to mean that, for example, designs which heat not just an area, but rather that heat the entire interior of a fuel cell vehicle, by way of example, can also be contemplated. In the heat exchanger 85, heat from the fourth fluid is released to the air of the vehicle interior or an area of the vehicle interior—such as for example the area of the driver of the vehicle. In addition, a plurality of heat exchangers 85 integrated into the fourth circulation 70 for heat exchange from the fourth fluid to the indoor air at various points in the vehicle interior, for the purpose of heating different areas of the vehicle interior, can also be contemplated. For this purpose, known configurations with valve circuits can be contemplated. These enable, in addition to the convector(s) 81, independent heating of the individual areas of the vehicle interior with heat from the fourth fluid via, heat exchangers 85. The heating devices 75, 83 additionally heating the fourth fluid are, by way of example, PTC heaters which can be operated with current at 400V AC, which are suitable and known, or—for example—heating devices which can be operated with hydrogen as the fuel.

The first circulation 10 which conveys the first fluid can thus pump, in the heat pump operation of the fuel cell arrangement 55, heat transferred to the third fluid in the third circulation 50 and further to the second fluid, as well as heat transferred from the traction battery 39 to the second fluid in the second circulation 30 to the fourth circulation 70 which conveys the fourth fluid.

The volume flows in the four circulations 10, 30, 50, 70 are controlled with a control device of the circulation system 1, which is not shown in FIG. 1 for reasons of clarity. The additional heating devices 37, 75, 83 are also controlled by the same. An automatic control by the control device can be contemplated. In this way, an automatic control can be carried out—for example, according to the temperatures of the traction battery 39 and/or the fuel cell arrangement 55 and/or the outside air and/or the air in the vehicle interior or in areas of the vehicle interior.

In principle, a design of the first circulation 10 in which the first fluid is operated in the subcritical region, as with a conventional coolant made of an HFC, can be contemplated.

Figure 2:
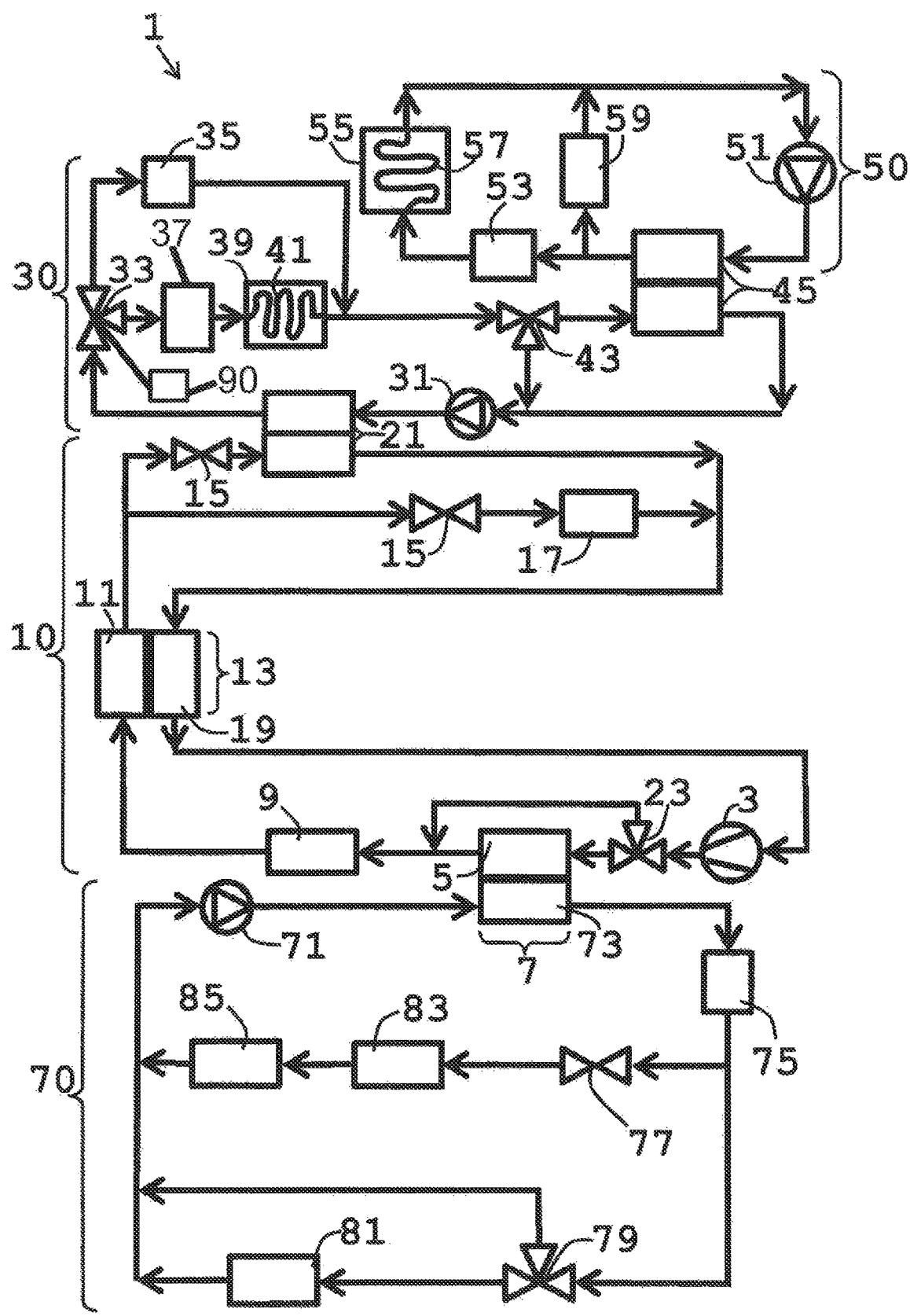
FIG. 2 shows, in a block diagram, another embodiment of the circulation system according to the invention, for a fuel cell vehicle.

FIG. 2 shows, in a further block diagram, a further embodiment of the circulation system 1 according to the invention, for a fuel cell vehicle. Except for the part of the second circulation 30 with the switching device 33, the at least one further heat exchanger 35, the heating device 37 which can additionally heat the second fluid, and the heat exchange connection 41 designed for heat exchange between the second fluid and a traction battery 39, this embodiment corresponds to the embodiment shown in FIG. 1. As, such, attention is hereby directed, in regards to the description and reference number of the other parts of the circulation system 1—in particular, the first circulation 10, the third circulation 50, the fourth circulation 70, including its components, and the control device w to the explanations provided above for FIG. 1.

The at least one heat exchanger 35 for cooling the air of at least an area of an interior of a fuel cell vehicle, is arranged in a bypass arrangement with respect to the heating device 37 which can additionally heat the second fluid, and the heat exchange connection 41 designed for the heat exchange between a traction battery 39 and the second fluid. The switching device 33 includes a controllable three-way valve in this case—without being restricted to the same. The switching device 33 switches the flow path of the second fluid—specifically, on one side through the bypass with the at least one further heat exchanger 35, and on the other side through the heating device 37—and through the heat exchange connection 41 designed for the heat exchange between a traction battery 39 and the second fluid. The switching device 33 has a controller 90, with which the fraction of the flow volume of the second fluid to the at least one further heat exchanger 35 and also the fraction of the flow volume of the second fluid to the heating device 37 and to the heat exchange connection 41 with the traction battery 39, can be controlled. As such, the cooling effect for, on the one hand, the traction battery 39, and on the other hand, the air for at least one area of the vehicle interior, can be controlled continuously, according to the cooling needs, by the second fluid between these two paths of the second fluid in the second circulation.

The embodiments of a circulation system 1 shown in FIG. 1 and FIG. 2 are designed, by way of example, for a bus equipped with an electric drive motor and a fuel cell arrangement 55. Designs of the circulation system 1 according to the invention for other fuel cell vehicles, such as passenger motor vehicles, can also be contemplated.

The invention claimed is:

1. A circulation system for a fuel cell vehicle, comprising:
an initial heat exchanger and first and second heat exchangers, the initial, first, and second heat exchangers each comprising first and second sides;
first, second, and third conveying devices;
a first flow circuit which conveys a first fluid, in which is arranged, in the intended flow direction of the first fluid, at least one compressor, the first side of the initial heat exchanger used as a condenser or gas cooler, at least one expansion element, and the first side of the first heat exchanger used as an evaporator, wherein the first heat exchanger, to which the first fluid can be conveyed, is arranged after the at least one expansion element and before the at least one compressor;
a second flow circuit which conveys a second fluid, the second flow circuit adapted for cooling a traction battery, the second flow circuit comprising the first conveying device, the first conveying device being adapted to convey the second fluid, the second side of the first heat exchanger, to which the second fluid can be conveyed for a heat exchange with the first fluid, the first side of the second heat exchanger, and a first heat exchange connection structured and arranged to permit heat exchange between the second fluid and the traction battery;
a third flow circuit which conveys a third fluid, the third flow circuit adapted for cooling a fuel cell arrangement, the third flow circuit comprising the second conveying device, the second conveying device being adapted to convey the third fluid, the second side of the second heat exchanger, to which the third fluid can be conveyed for a heat exchange with the second fluid, and a second heat exchange connection structured and arranged to permit heat exchange between the fuel cell arrangement and the third fluid;
the circulation system further comprising a fourth flow circuit which conveys a fourth fluid, the fourth circuit comprising the third conveying device, the third conveying device being adapted to convey the fourth fluid, at least one of a fourth flow circuit heat exchanger or a fourth flow circuit convector to which the fourth fluid can be conveyed for the purpose of heating at least one interior of the fuel cell vehicle, and the second side of the initial heat exchanger, to which the fourth fluid can be conveyed for a heat exchange with the first fluid;
wherein the first side of the initial heat exchanger, to which the first fluid can also be conveyed, is arranged in the first flow circuit after the at least one compressor and before the at least one expansion element;
wherein the second heat exchanger used for the heat exchange between the second fluid and the third fluid is arranged in the second flow circuit after the first heat exchange connection and before the first heat exchanger, in the flow direction of the second fluid such that the second fluid can flow through the second side of the first heat exchanger, then through the first heat exchange connection and then through the first side of the second heat exchanger.

2. The circulation system according to claim 1, wherein the first fluid is supercritically operable.

3. The circulation system according to claim 2, wherein the first fluid is $CO_2$.

4. The circulation system according to claim 1, wherein the second and fourth fluids comprise water, and the third fluid is deionized water.

5. The circulation system according to claim 1, further comprising a fourth heat exchanger, the fourth heat exchanger being positioned within the first flow circuit after the at least one expansion element and before the at least one compressor in the flow direction of the first fluid, the fourth heat exchanger being structured and arranged as a fluid to air heat exchanger and operated as an evaporator.

6. The circulation system according to claim 1, further comprising a heating device adapted to heat the second fluid and which is or can be connected to the second flow circuit.

7. The circulation system according to claim 6, the heating device being positioned in the second flow circuit before the first heat exchange connection.

8. The circulation system according to claim 1, further comprising one or more heating devices adapted to heat the fourth fluid and which is or can be connected to the fourth flow circuit.

9. The circulation system according to claim 1, the second flow circuit comprising a further heat exchanger for cooling at least a portion of the at least one interior of the fuel cell vehicle, the further heat exchanger being positioned in the intended flow direction of the second fluid after the first heat exchanger and before the first heat exchange connection;
 the further heat exchanger adapted to be connected to and disconnected from the second flow circuit by means of a switching device.

10. The circulation system according to claim 1, the second flow circuit comprising a further heat exchanger for cooling at least a portion of the at least one interior of the fuel cell vehicle, the further heat exchanger being positioned in the intended flow direction of the second fluid after the first heat exchanger and before the first heat exchange connection and bypasses the first heat exchange connection;
 the further heat exchanger adapted to be connected to and disconnected from the second flow circuit by means of a switching device.

11. The circulation system according to claim 10, further comprising a controller adapted to operate the switching device to control flow volume of the second fluid to the at least one further heat exchanger and also flow volume of the second fluid to the first heat exchange connection with the traction battery.

12. The circulation system according to claim 1, adapted for a bus equipped with an electric drive motor and the fuel cell arrangement.

\* \* \* \* \*